United States Patent
Cai et al.

(10) Patent No.: US 9,441,547 B2
(45) Date of Patent: Sep. 13, 2016

(54) MODEL-BASED OPTIMAL CONTROL FOR STALL MARGIN LIMIT PROTECTION IN AN AIRCRAFT ENGINE

(71) Applicant: UNITED TECHNOLOGIES CORPORATION, Farmington, CT (US)

(72) Inventors: Chaohong Cai, Weatogue, CT (US); Joshua Adams, New Hartford, CT (US); Richard P. Meisner, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/623,063

(22) Filed: Feb. 16, 2015

(65) Prior Publication Data
US 2015/0345403 A1    Dec. 3, 2015

Related U.S. Application Data

(60) Provisional application No. 62/006,653, filed on Jun. 2, 2014.

(51) Int. Cl.
*G06F 19/00*   (2011.01)
*G05D 17/00*   (2006.01)
(Continued)

(52) U.S. Cl.
CPC ............ *F02C 9/00* (2013.01); *F01D 17/00* (2013.01); *F02C 9/52* (2013.01); *F02C 9/54* (2013.01);
(Continued)

(58) Field of Classification Search
CPC  G06F 1/26; G06K 9/00046; G06K 9/00073; G06K 9/0008; G06T 7/0085; F01K 13/02; F01K 23/067; F01K 23/101; F05D 2260/821; F05D 2270/71; F23N 2023/48; H02J 3/16; H02J 3/382; Y02E 20/16; F01D 17/00

USPC ............ 701/100, 239, 39.34, 39.37, 39.42, 701/39.43, 39.44, 804; 700/287, 30, 282, 700/290; 60/239; 180/301
See application file for complete search history.

(56) References Cited

U.S. PATENT DOCUMENTS 4,928,484 A * 5/1990 Peczkowski ............. F02C 9/28
60/240
5,091,843 A * 2/1992 Peczkowski ............. F02C 9/28
700/30

(Continued)

FOREIGN PATENT DOCUMENTS

EP    1538319 A1    6/2005
EP    1571509 A1    9/2005

OTHER PUBLICATIONS

European Search Report for Application No. 15170310.5 dated Oct. 19, 2015.

*Primary Examiner* — Muhammad Shafi
(74) *Attorney, Agent, or Firm* — Cantor Colburn LLP

(57) ABSTRACT

A control system for a gas turbine engine, a method for controlling a gas turbine engine, and a gas turbine engine are disclosed. The control system may include a hybrid model predictive control (HMPC) module, the HMPC module receiving power goals and operability limits and determining a multi-variable control command for the gas turbine engine, the multi-variable control command determined using the power goals, the operability limits, actuator goals, sensor signals, and synthesis signals. The control system may further include system sensors for determining the sensor signals and a non-linear engine model for estimating corrected speed signals and synthesis signals using the sensor signals, the synthesis signals including an estimated stall margin remaining. The control system may further include a goal generation module for determining actuator goals for the HMPC module using the corrected speed signals and an actuator for controlling the gas turbine engine based on the multivariable control command.

20 Claims, 6 Drawing Sheets

(51) Int. Cl.
*F02C 9/00* (2006.01)
*F01D 17/00* (2006.01)
*F02C 9/52* (2006.01)
*F02C 9/54* (2006.01)

(52) U.S. Cl.
CPC ....... *F05D 2260/80* (2013.01); *F05D 2260/81* (2013.01); *F05D 2260/83* (2013.01); *F05D 2270/301* (2013.01); *F05D 2270/303* (2013.01); *F05D 2270/304* (2013.01); *F05D 2270/334* (2013.01); *F05D 2270/44* (2013.01)

(56) References Cited

U.S. PATENT DOCUMENTS

| | | | |
|---|---|---|---|
| 6,718,234 B1* | 4/2004 | Demoro | B01J 19/0033 700/269 |
| 8,417,361 B2* | 4/2013 | Kumar | F02C 3/28 700/288 |
| 9,121,607 B2* | 9/2015 | Labbe | F23N 5/00 |
| 2004/0123600 A1* | 7/2004 | Brunell | F02C 9/00 60/773 |
| 2005/0193739 A1 | 9/2005 | Brunell et al. | |
| 2008/0229754 A1* | 9/2008 | Goebel | F02C 9/00 60/772 |
| 2012/0245748 A1* | 9/2012 | Kumar | F02C 3/28 700/288 |
| 2013/0122433 A1* | 5/2013 | Labbe | F23N 5/00 431/12 |
| 2013/0131878 A1* | 5/2013 | Wilkins | G06F 1/26 700/287 |
| 2013/0158680 A1 | 6/2013 | Fuller | |
| 2015/0171729 A1* | 6/2015 | Scandola | H02M 3/158 363/21.02 |

\* cited by examiner

MODEL-BASED OPTIMAL CONTROL FOR STALL MARGIN LIMIT PROTECTION IN AN AIRCRAFT ENGINE

CROSS-REFERENCE TO RELATED APPLICATION

This application is a non-provisional patent application claiming priority under 35 USC §119(e) to U.S. Provisional Patent Application Ser. No. 62/006,653 filed on Jun. 2, 2014.

TECHNICAL FIELD OF THE DISCLOSURE

The present disclosure relates to gas turbine engines, and more particularly, to control systems for gas turbine engines.

BACKGROUND OF THE DISCLOSURE

Over the course of an operating cycle of a gas turbine engine, a compressor section of the engine may experience compressor stall. Compressor stall is a limiting factor in the operation of gas turbine engines. In modern gas turbine engines, unstable flow may develop in the compressor during acceleration phases and/or under high altitude and lower speed flight conditions. Such unstable flow may lead to stall, which may increase turbine temperature and mechanical vibration along with simultaneously reducing the cooling air supplied to the turbine. Stall may lead to turbine failure if the compressor stall is not recognized and corrective action is not taken.

During transient engine operation (e.g., during engine acceleration or deceleration), the compressor operating line may shift significantly with respect to steady-state conditions. For example, the flow admitted by the turbine as a function of pressure may be significantly reduced as fuel flow is increased during an engine acceleration transient, thereby substantially changing the compressor operating line. In addition, other transient effects such as heat transfer, tip clearance, and variable geometry and bleed control may result in large variations in the overall compressor operating line. Such variations may in turn, affect individual compressor stage operating conditions and a margin to aerodynamic instability.

Monitoring engine characteristics directly or indirectly may be an effective means for monitoring and controlling stall margin in a gas turbine engine. The thermal characteristics of the engine, including the compressor section, can be synthesized or calculated using sensed parameters. Further, thermal characteristics may be estimated by linear or non-linear models of engine components and their characteristics. Such characteristics may provide information used to determine an acceptable level of stall margin. Such parameters may be monitored and/or controlled using a control system having a variety of hardware and/or software control elements.

Modern aircrafts employing gas turbine engines require fast response and better transient performances under compressor stall requirements at all flight conditions. Thusly, a need exists for a control system that controls stall margin of a gas turbine engine in real time and overcomes computational inefficiencies of prior control system designs.

SUMMARY OF THE DISCLOSURE

In accordance with one aspect of the disclosure, a control system for a gas turbine engine is disclosed. The gas turbine engine may include a compressor section. The control system may include a Hybrid Model Predictive Control (HMPC) module, the HMPC module receiving power goals and operability limits and determining a multi-variable control command for the gas turbine engine, the multi-variable control command determined using the power goals, the operability limits, actuator goals, sensor signals, and synthesis signals. The control system may further include system sensors for determining the sensor signals and a non-linear engine model for estimating corrected speed signals and synthesis signals using the sensor signals, the synthesis signals including an estimated stall margin remaining. The control system may further include a goal generation module for determining actuator goals for the HMPC module using the corrected speed signals and an actuator for controlling the gas turbine engine based on the multivariable control command.

In a refinement, the HMPC module may include a state variable model of the gas turbine engine for determining the multi-variable control command.

In a further refinement, the HMPC module may include an optimization formulation, the optimization formulation receiving input from the state variable model, the power goals, and the operability limits to determine constrained optimization data.

In a further refinement, the optimization formulation may utilize a dynamic model prediction horizon of one or more steps.

In another further refinement, the HMPC module may include an optimization solver, the optimization solver receiving constrained optimization data from the optimization formulation to determine the multivariable control command.

In a refinement, the operability limits may include a stall margin remaining limit.

In a refinement, the corrected speed signals may include at least one of a corrected high pressure compressor speed and a corrected low pressure compressor speed.

In a refinement, the sensor signals may include sensed engine state variables, the sensed engine state variables including at least one of a speed associated with a component of the gas turbine engine, or a temperature of a component of a gas turbine engine.

In a refinement, the synthesis signals may include, at least, an engine thrust value associated with the gas turbine engine.

In a refinement, the power goals may include at least one of a thrust goal, an engine spool speed goal, and a torque goal.

In accordance with another aspect of the disclosure, a method for controlling a gas turbine engine is disclosed. The method may include determining sensor signals using system sensors, estimating corrected speed signals and synthesis signals using the sensor signals, the synthesis signals including an estimated stall margin remaining. The method may further include determining actuator goals for a HMPC module using the corrected speed signals, receiving power goals and operability limits by the HMPC module, and determining a multi-variable control command for the gas turbine engine using the HMPC module, the multi-variable control command determined using the power goals, the operability limits, actuator goals, sensor signals, and synthesis signals. The method may include controlling the gas turbine engine based on the multivariable control command using an actuator.

In a further refinement, determining the multi-variable control command may further include using an optimization formulation of the HMPC module, the optimization formulation receiving input from the state variable model, the power goals, and the engine operability limits to determine constrained optimization data.

In a further refinement, determining the multi-variable control command may include using an optimization solver of the HMPC module, the optimization solver receiving constrained optimization data from the optimization formulation.

In accordance with another aspect of the disclosure, a gas turbine engine is disclosed. The gas turbine engine may include a compressor section, a combustor section downstream of the compressor section, and a turbine section downstream of the combustor section. The gas turbine engine may further include a control system. The control system may include a hybrid model predictive control (HMPC) module, the HMPC module receiving power goals and operability limits and determining a multi-variable control command for the gas turbine engine, the multi-variable control command determined using the power goals, the operability limits, actuator goals, sensor signals, and synthesis signals. The control system may further include system sensors for determining the sensor signals and a non-linear engine model for estimating corrected speed signals and synthesis signals using the sensor signals, the synthesis signals including an estimated stall margin remaining. The control system may further include a goal generation module for determining actuator goals for the HMPC module using the corrected speed signals and an actuator for controlling the gas turbine engine based on the multivariable control command.

In a refinement, the compressor section may include a high pressure compressor and a low pressure compressor.

In a refinement, the multi-variable control command may include instructions for the actuator to position a vane of the compressor section.

In a further refinement, the vane is at least one of a low pressure compressor stator vane or a high pressure compressor stator vane.

In a refinement, the multi-variable control command may include instructions for the actuator to position a bleed of the compressor section.

In a refinement, the gas turbine engine may further include an exit nozzle, wherein the multi-variable control command includes instructions for positioning the exit nozzle.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
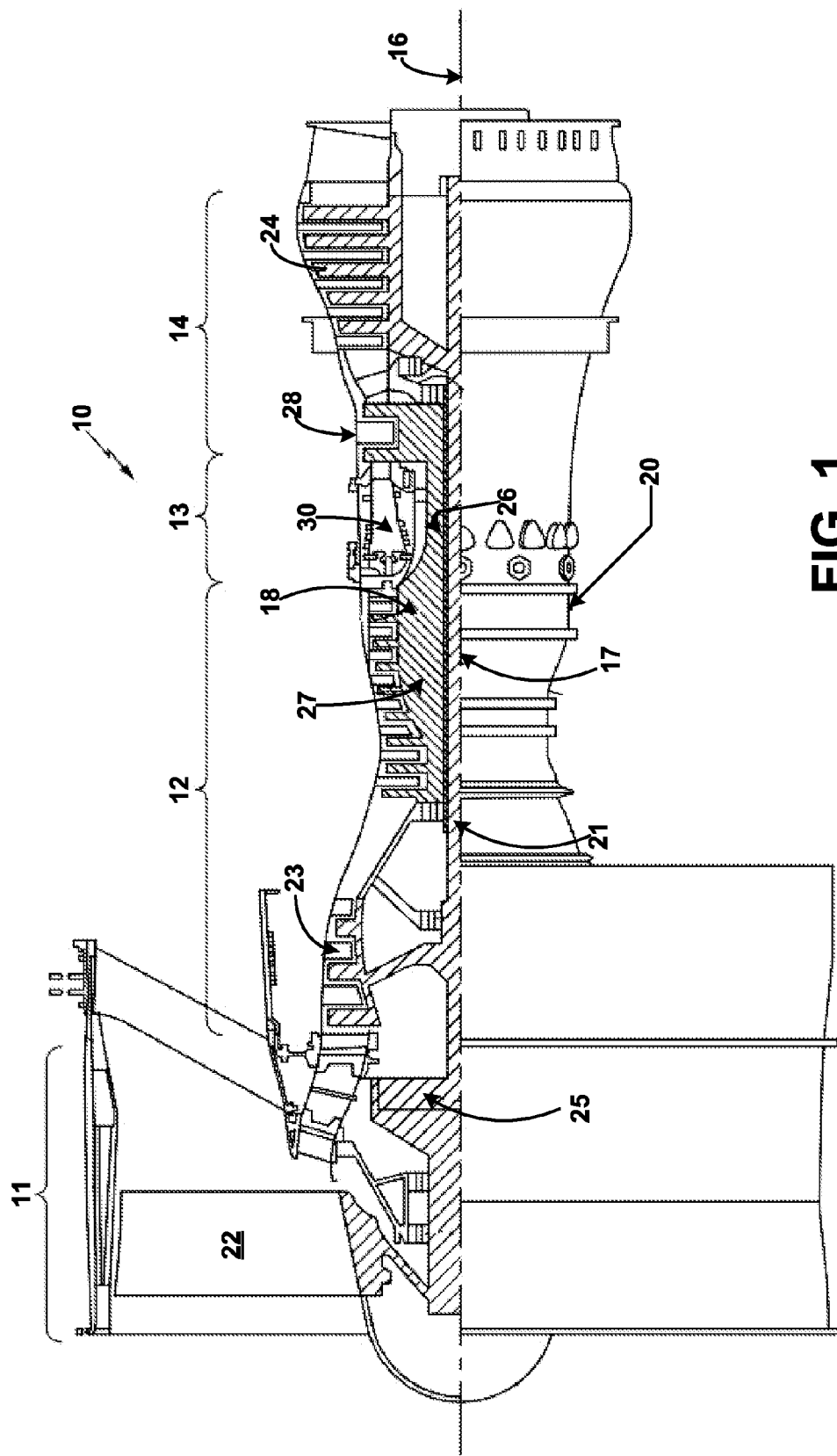
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust, rotorcraft power and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11, the fan section 11 drawing in ambient air and directing the ambient air to a compressor section 12. The incoming air is greatly compressed by the compressor section 12 and directed to a combustor section 13 where it is mixed with fuel and combusted. The products of that combustion, in the form of very hot and expanding gases, are directed to a turbine section 14 shown to be downstream of the combustor section 13. The turbine section 14 and/or compressor section 12 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, and fan section 11 all revolve around a central engine axis 16.

The gas turbine engine 10, for a typical turbofan engine application, may include a fan section, a compressor section (for example, low compressor and high compressor), a combustor section, and a turbine section (for example, low turbine and high turbine). The gas turbine engine 10 for a typical turboshaft engine application may include an inlet particle separator section, a compressor section (for example, low compressor and high compressor), a combustor section, a turbine section (for example, low turbine and high turbine), and a section of power turbine that extracts power from the gas generator. The gas turbine engine 10 may have other power generation applications.

Further, the gas turbine engine 10 may include a low spool 17 and a high spool 18 mounted for rotation about the central engine axis 16 relative to an engine case structure 20. The low spool 17 may include an inner shaft 21 that interconnects to a fan 22, a low pressure compressor 23 ("LPC") and a low pressure turbine 24 ("LPT"). The inner shaft 21 may drive the fan 22 directly or through a geared architecture 25 to drive the fan at a lower speed than the low spool 17. The high spool 18 may include an outer shaft 26 that interconnects a high pressure compressor 27 ("HPC") and high pressure turbine ("HPT") 28. A combustor 30 is arranged between the HPC 27 and the HPT 28. The inner shaft 21 and the outer shaft may be concentric and rotate about the central engine axis 16 which is collinear with their respective longitudinal axes.

Air within the gas turbine engine 10 may be compressed by the LPC 23 and/or the HPC 27. Said air may then be mixed with fuel and burned within the combustor 30 and then may be expanded throughout the HPT 28 and/or the LPT 24. The LPT 24 and/or the HPT 54 may rotationally drive the low spool 17 and the high spool 18, respectively, in response to the expansion of the fuel/air mixture.

As mentioned above, the compressor section 12 may include a plurality of blades radially extending from a shaft forming rotating sections, or rotors, and a plurality of stator vanes may radially extend inwardly from a stator section of the compressor section 12. Some stator vanes may be variable stator vanes having a controllable angle-of-attack which may be adjusted by actuators associated with an engine control system.

Efficiency and performance of the gas turbine engine 10 may be affected by aerodynamic stall associated with the compressor section 12. This condition results from excessive compressor airfoil loading, and may, in turn, result in significantly degraded compressor and engine performance. Furthermore, the gas turbine engine 10 may require specific control system actions to recover normal engine operation, in part due to the hysteresis which may accompany the transition into and out of stalled operation. Monitoring and controlling the gas turbine engine 10 based on monitoring stall margin in view of stall margin limits may increase performance of the gas turbine engine, by allowing robust operation nearer to this limit.

Figure 2:
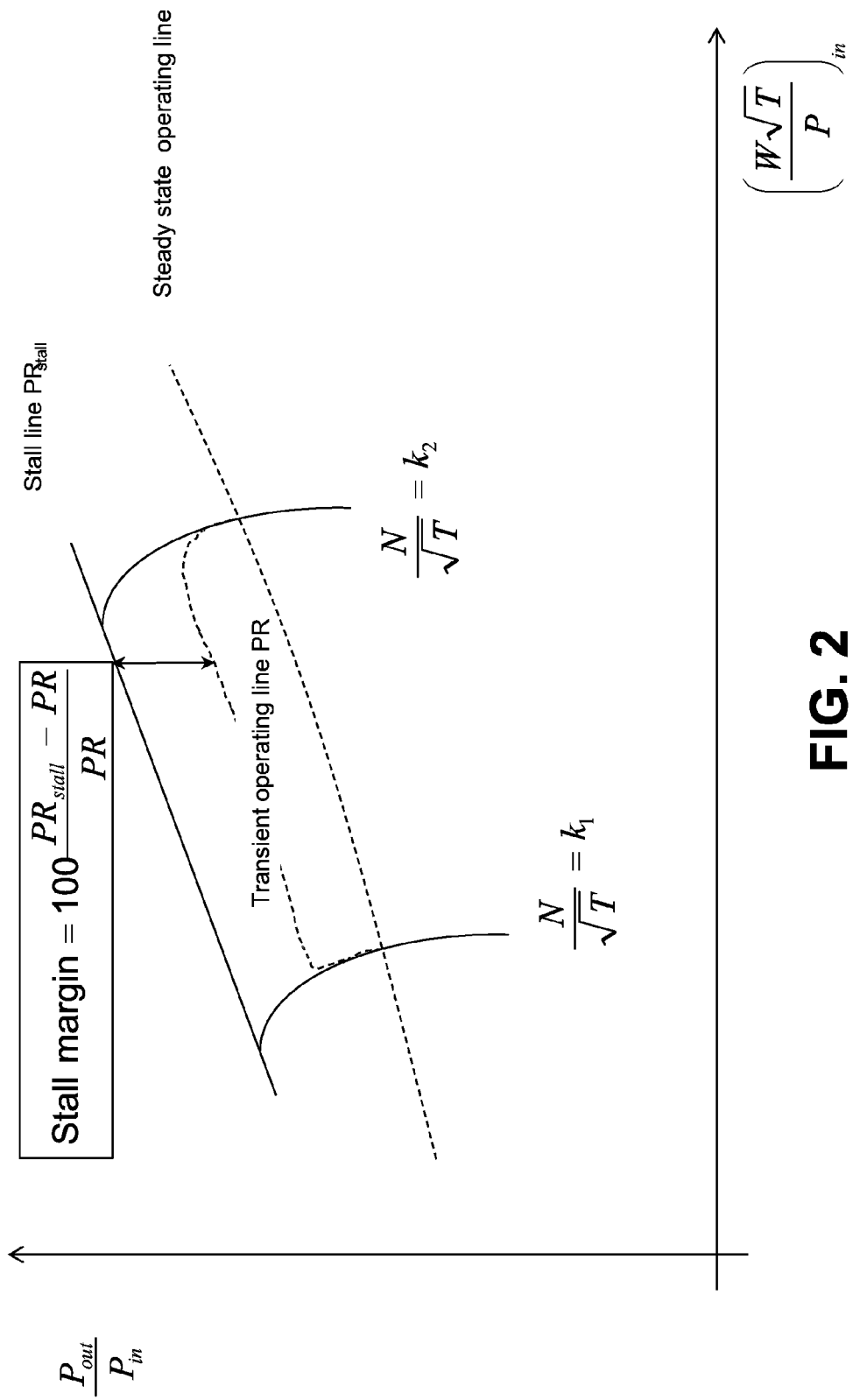
FIG. 2 is an example compressor map of the gas turbine engine having speed lines, a stall line, and operating lines.

A compressor map with speedlines, operating lines, stall line, and stall margin, as shown in FIG. 2, illustrates the compressor stall margin limit in detail. In this figure, nominal compressor performance is depicted as a series of lines of constant corrected compressor speed defining the relationship of compressor pressure ratio as a function of compressor corrected flow at that speed. (For definition of corrected speed and flow, see for example, "Gas Turbine Parameter Corrections", A. J. Volponi, ASME 98-GT-947). Furthermore, the compressor stall line indicating the upper limit of stall-free operation is depicted as a stall pressure ratio as a function of corrected flow. Additionally, the engine system imposes an operating line on the component-level compressor map. Note, for example, in FIG. 2 that both steady state and transient (acceleration, for example) operating lines are depicted. As shown in FIG. 2, a stall margin remaining calculation may be made indicating the normalized gap or margin between the current operating point on the compressor map and the stall line. Note that additional compressor and operating line effects such as deterioration, heat transfer, variable stator vanes, and tip clearance, may be estimated and used to improve the stability margin remaining calculation.

Figure 3:
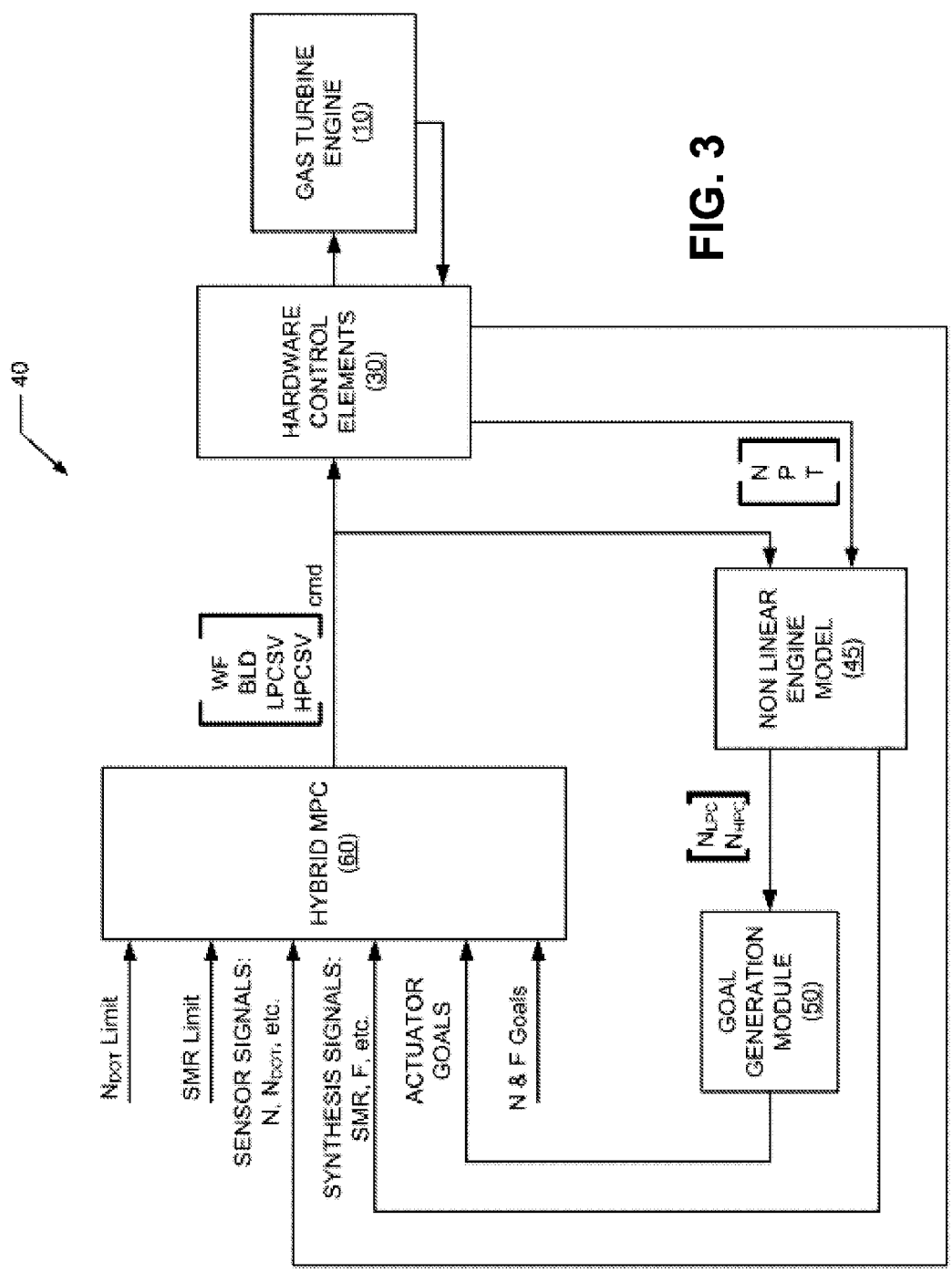
FIG. 3 is a block diagram of an exemplary control system for a gas turbine engine.

A control system 40, as shown in FIG. 3, may be employed to monitor engine conditions and control the gas turbine engine 10 based on stall margin estimations and goals. The control system may employ hardware control elements 30 (e.g., the system sensors 36 of FIG. 5, described below) for determining sensor signals associated with the gas turbine engine 10. The sensor signals may include sensed engine state variables such as, but not limited to, a speed associated with a component of the gas turbine engine (e.g., a spool speed N), a pressure associated with an environment of the gas turbine engine (P), and/or a temperature of a component of a gas turbine engine (T). For example, the sensed signals may include compressor spool speeds, pressure ratios associated with volumes of the compressor section 12, and/or surface temperatures of the compressor section 12.

The sensed signals may be received and processed by a non-linear engine model 45. The non-linear engine model 45 may contain aero-thermal representations, or component modules, of components of the gas turbine engine 10. The component modules within the non-linear engine model 45 may operate according to the system's constraints related to mathematical abstractions of physical laws that govern behavior of the gas turbine engine 10 (i.e., laws of conservation of energy, conservation of mass, conservation of momentum, Newton's $2^{nd}$ law for rotating systems, and/or any additional known calculable physics model). The system constraints for each contained module within the non-linear engine model 45 may have specific constraints programmed within to simulate a monitored area and/or function of the gas turbine engine 10 (i.e., a bypass duct bleeds module, a low spool compressor module, a high spool compressor module, etc.).

The non-linear engine model 45 may use input vectors along with internal solver states, representing on-board corrector states, solver states, and physics states, while functioning. For example, the non-linear engine model may receive sensed signals and/or may receive prior state commands from internal processing and/or from a hybrid model predictive control (HMPC) module 60. The solver states may be introduced to address fast dynamics, resolve algebraic loops and smooth highly non-linear model elements. The non-linear engine model 45 may utilize a sensor fusion technique (e.g. Kalman filter algorithm or unbiased estimation algorithm) for improving engine state estimation accuracy.

After a pass for the current state, the non-linear engine model 45 may process input data and determine synthesis signals for use by the HMPC module 60. Synthesis signals may include an estimated stall margin remaining (SMR) for the gas turbine engine 10 and/or an estimated thrust (F) of the gas turbine engine 10, among other signals. Synthesis signals may also include engine state estimation signals that are needed for HMPC module 60 in the processes of dynamic model prediction and constrained optimization problem formulation. The non-linear engine model may also determine corrected speed signals associated with the gas turbine engine 10 by using its input data. Corrected speed signals may include, but are not limited to including a corrected spool speed of the LPC 23 ($N_{LPC}$) and/or a corrected spool speed of the HPC 27 ($N_{HPC}$).

The corrected speed signals may be input to a goal generation module 50. To aid in controlling the engine based on stall margin remaining, the corrected speed signals may be used by the goal generation module 50 to determine actuator goals for use by the HMPC module 60. The goal generation module 50 may utilize other data aside from the corrected speed signals to determine actuator goals.

Figure 4:
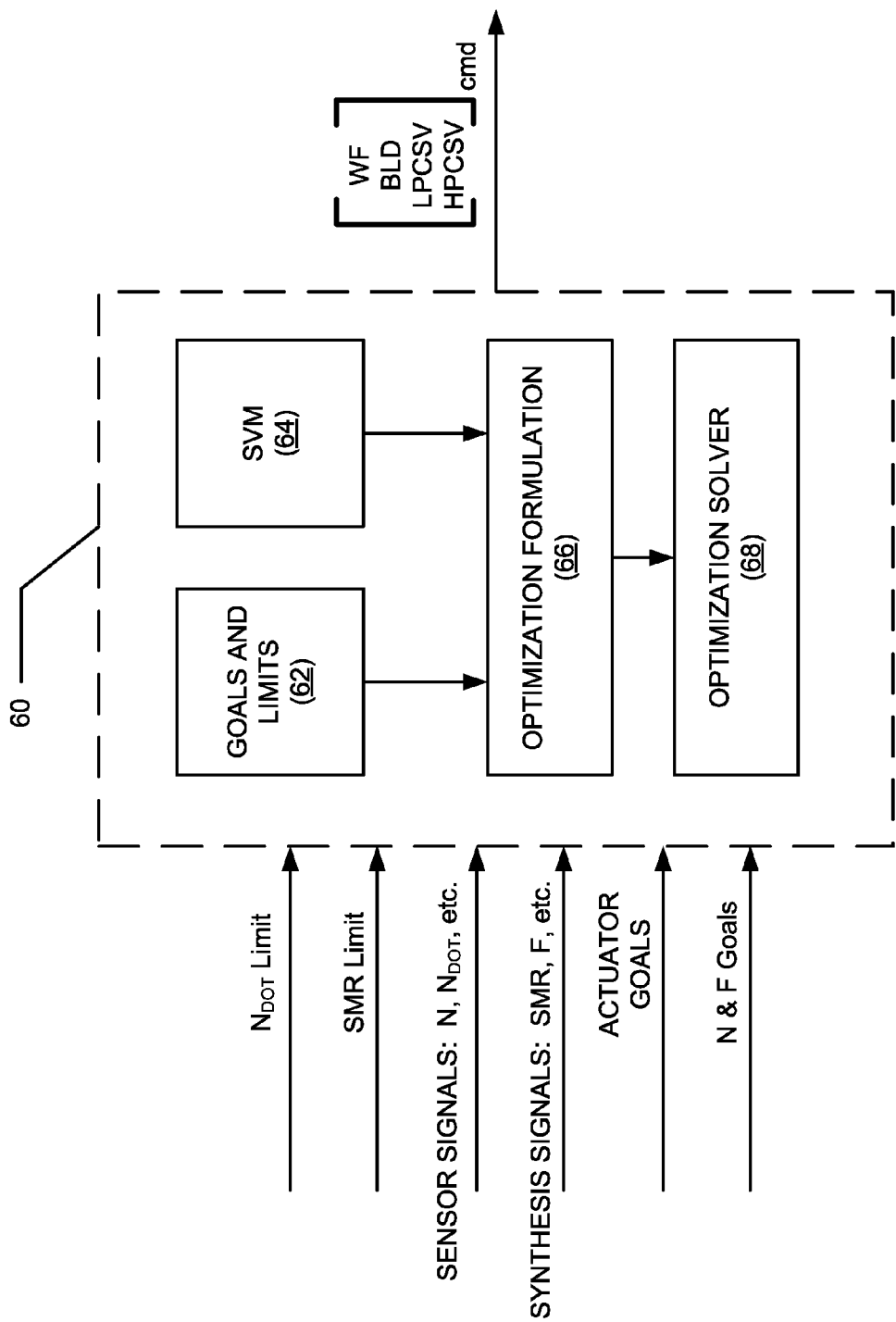
FIG. 4 is a block diagram of an exemplary hybrid model predictive control (HMPC) block of the control system of FIG. 3.

Turning now to FIG. 4, an example of the HMPC module 60 of FIG. 3 is shown. The HMPC module 60 may be a computer implemented control law for controlling and predicting behavior of the gas turbine engine 10 in real time. As a multivariable control law, the HMPC 60 is capable of decoupling responses of naturally cross coupled systems where effector changes simultaneously affect goals. Effector changes are means for adjusting or manipulating control variables, such as a thrust or power value.

More specifically, a hybrid model predictive control (HMPC) module 60 determines the current effector requests and makes a second model match the desired output in one next time step. The HMPC module 60 may presume that the dynamics of the gas turbine engine 10 are controlled and the desired outputs are known in the form of analytical models. The HMPC module 60 governs control law using physical limits associated with the gas turbine engine 10, such as a stall margin remaining limit (SMR limit) and an engine spool acceleration limit ($N_{DOT}$). An objective of the HMPC module 60 is to make goal variables track the desired response while holding to the physical limits given.

The control law executed by the HMPC module 60 may be generally based on a linear model, such as the state variable model (SVM) 64. The SVM 64 may be implemented within the HMPC 60 to make various predictions concerning the current iteration of the control processing and requests. The SVM 64 may use any inputs of the HMPC 60 and may utilize a model prediction horizon of a single step or multiple steps in processing dynamic model data. Output of the SVM 64 may be analyzed with the goals and limits 62 processed by and/or input to the HMPC 60 using an optimization formulation 66. Output of the optimization formulation 66 may be constrained optimization problem data for which optimization software will be able to solve, as a numerically iterative process, in real-time. The optimization solver 68 may receive constrained optimization data from the optimization formulation 66 in order to generate multi-variable control command. An example of real-time control logic for the optimization formulation 66 and optimization solver 68 in the HMPC 60 which may be implemented is illustrated in U.S. patent Ser. No. 13/331,844 which is hereby incorporated by reference.

After computations for the current pass complete, the HMPC 60 will output a control command to the hardware control elements 30 for use in controlling the gas turbine engine 10 with respect to stall margin remaining. The control commands may include instructions received by actuators to control components of the gas turbine engine 10. Such control commands may include instructions for positioning a stator vane of the LPC 23 (LPCSV), instructions for positioning a stator vane of the HPC 27 (HPCSV), instructions for positioning a bleed of the engine 10 (BLD), such as a stability bleed, and/or instructions for positioning an exit nozzle (A8). The command instructions may also include a fuel flow rate (WF) to control fuel flow of the gas turbine engine 10 in view of stall margin remaining goals and thrust goals.

Figure 5:
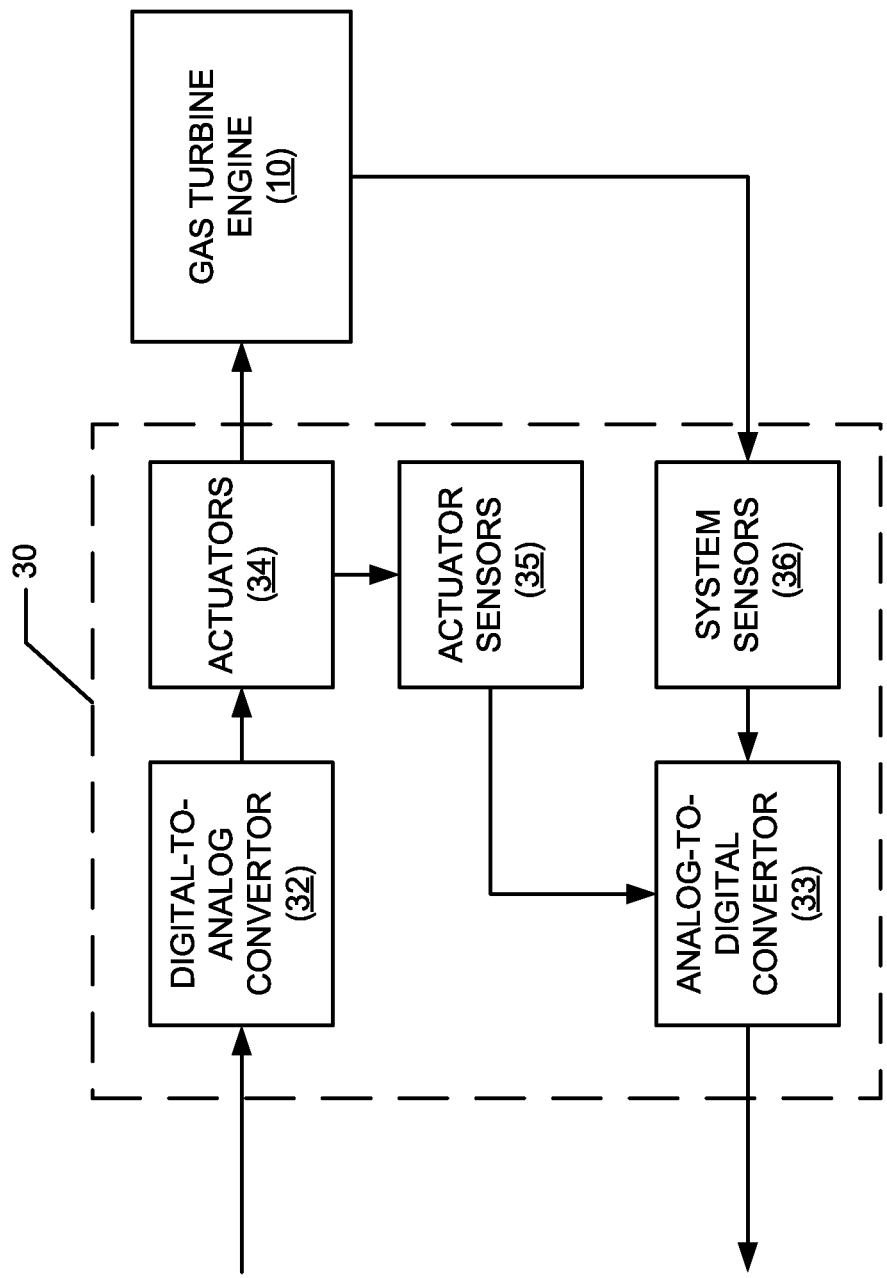
FIG. 5 is a block diagram of exemplary hardware control elements of the control system of FIG. 3.

Referring now to FIG. 5 and with continued reference to FIG. 3, hardware control elements 30 are shown. The hardware control elements 30 may convert digital data generated by the HMPC 60 to an analog form readable by the gas turbine engine 10 (e.g., electrical signals), convert analog data generated by the gas turbine engine 10 into digital data readable by the software control elements 40, condition such input and output data for readability, and/or control actuators 34 associated with the gas turbine engine 10.

The digital-to-analog convertor 32 can transform digital signals generated by the HMPC 60 into actuator requests. The actuators 34 may be one or more devices which use control hardware to position various control components of the apparatus 10 in accordance with instructions generated by the HMPC 60. Actuators, such as the actuators 34, may be designed to provide quick and accurate control of an apparatus.

Actuator sensors 35 may be included to measure various states of the actuators 34, wherein the actuator states (or positions) may be related to the physical configuration of the various control components of the apparatus 10. For example, fluid-based systems often include actuators whose linear or angular positions are sensed by actuator sensors 34, and which are related to the physical position of control surfaces or other control devices located proximate to a compressor, combustor, turbine and/or nozzle/exhaust assembly.

Further, the hardware control components 30 may include apparatus system sensors 36. The apparatus system sensors 36 may measure operational parameters associated with the apparatus 10. For example, fluid-based systems may include apparatus system sensors 36 that measure the working fluid pressure, temperature and fluid flow at various axial and radial locations in the flow path. Apparatus system sensors 36 may comprise a variety of different sensing devices, including, but not limited to, temperature sensors, flow sensors, vibration sensors, debris sensors, current sensors, voltage sensors, level sensors, altitude sensors and/or blade tip sensors. Apparatus system sensors 36 may be positioned to measure operational parameters related to the function of the gas turbine engine 10, e.g., parameters related to control commands submitted to HMPC 60 and control requests generated by HMPC 60 in order to direct actuators 34 to control the gas turbine engine 10.

Both the apparatus system sensors 36 and the actuator sensors 35 may produce electrical signals based upon a read-out result from said sensors. The electrical signals produced by the actuator sensors 35 and the apparatus system sensors 36 may be transmitted to an analog-to-digital convertor 33. The analog-to-digital convertor may convert the electrical signals into digital signal data which may be compatible with and read by downstream modules of the control system 40. The analog to digital convertor 33 may output sensor signals to the non-linear engine model 45 and/or the HMPC module 60.

While an example manner of implementing the control system 40 of FIG. 2 has been illustrated in FIGS. 3-5, one or more elements, processes, and/or devices illustrated in FIGS. 3-5 may be combined, divided, rearranged, omitted, eliminated and/or implemented in any other way. Further, the example elements of FIGS. 3-5 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example elements are hereby expressly defined to include a tangible computer readable medium storing the software and/or firmware. Further still, the example embodiments of have been illustrated in may include one or more elements, processes and/or devices in addition to, or instead of, those illustrated in FIGS. 3-5, and/or may include more than one of any or all of the illustrated elements, processes and devices.

Figure 6:
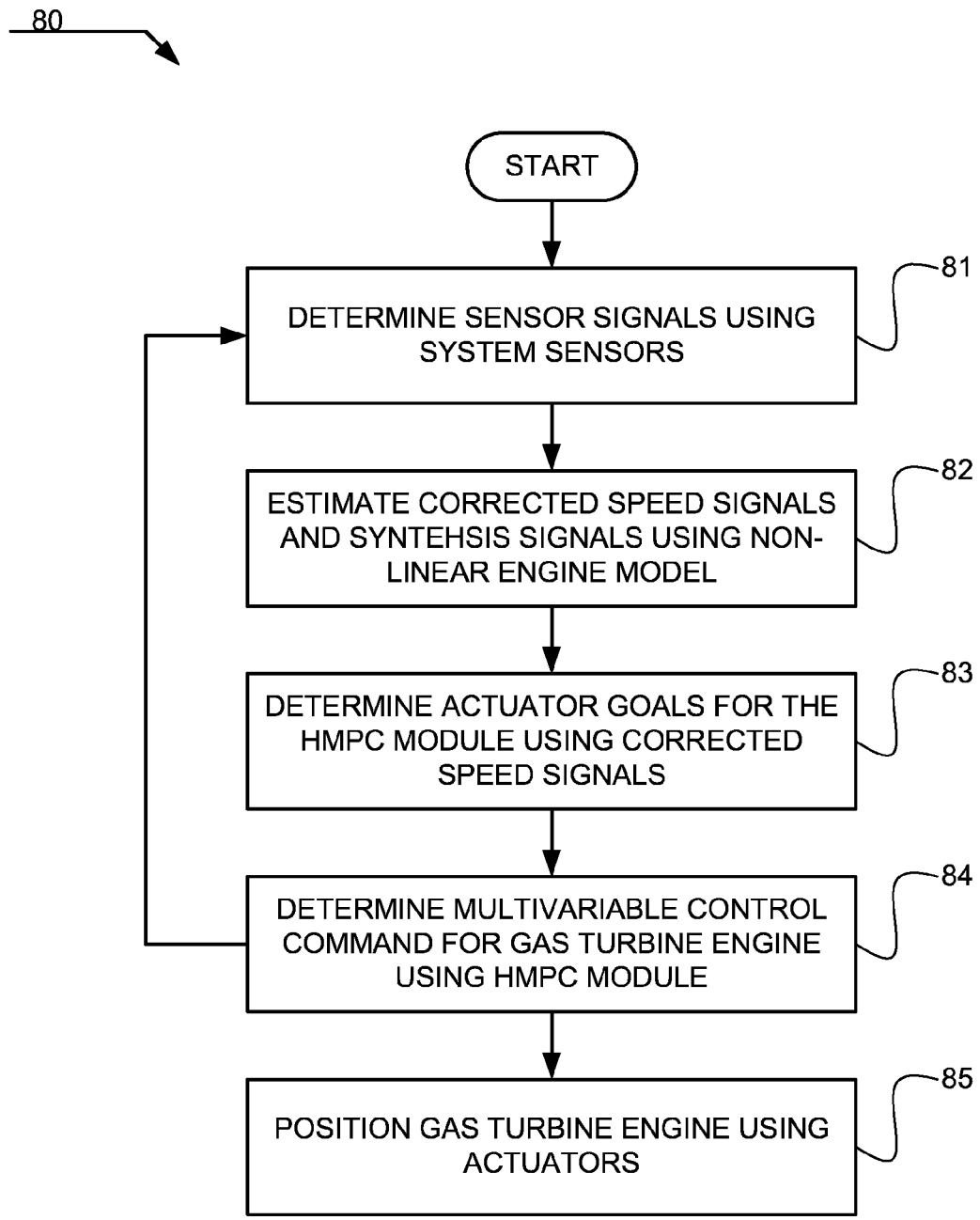
FIG. 6 is a flowchart for an exemplary method for controlling a gas turbine engine with respect to stall margin remaining.

Turning now to FIG. 6, a flowchart representing a method for controlling the gas turbine engine 10 based on stall margin remaining is shown. At block 81, sensor signals are determined using the system sensors 36. The sensor signals are received by the non-linear engine model 45 and used to estimate corrected speed signals and synthesis signals, the synthesis signals including an estimated stall margin remaining (block 82). Further, the corrected speed signals may be used by the goal generation module 50 to determine actuator goals for the HMPC module 60 (block 83). The HMPC module may receive power goals and operability limits and determine a multi-variable control command for the gas turbine engine using the HMPC module, wherein the multi-variable control command determined using the power goals, the operability limits, actuator goals, sensor signals, and synthesis signals (block 84). Using the multivariable control command, the actuators 34 may position the gas turbine engine 10 (block 85).

INDUSTRIAL APPLICABILITY

From the foregoing, it can be seen that the technology disclosed herein has industrial applicability in a variety of settings such as, but not limited to, control systems for a gas turbine engine. The gas turbine engine may be used in conjunction with an aircraft for generating thrust, a rotorcraft for generating power or torque, or for land-based applications for generating power. The teachings of the present disclosure may provide more consistent compressor stall and compressor surge protection and better compliance with operability limit holding requirements. Additionally, the control system of the present disclosure may provide faster response to user commands and smoother transient performance for the user. Further, the technology disclosed herein may allow a compressor of a gas turbine engine to operate at a more efficient level due to a reduced required stall margin.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A control system for a gas turbine engine, the gas turbine engine having a compressor section, the control system comprising:
   a hybrid model predictive control (HMPC) module, wherein the HMPC module receives power goals and operability limits and determines a multi-variable control command for the gas turbine engine in a single pass of inputs through the HMPC, wherein the multi-variable control command is determined using the inputs of power goals, the operability limits, actuator goals, sensor signals, and synthesis signals;
   system sensors determining the sensor signals;
   a non-linear engine model for estimating corrected speed signals and synthesis signals using the sensor signals, the synthesis signals including an estimated stall margin remaining;
   a goal generation module for determining actuator goals for the HMPC module using the corrected speed signals; and
   an actuator for controlling the gas turbine engine based on the multivariable control command.

2. The control system of claim 1, wherein the HMPC module includes a state variable model of the gas turbine engine for determining the multi-variable control command.

3. The control system of claim 2, wherein the HMPC module includes an optimization formulation, the optimization formulation receiving input from the state variable model, the power goals, and the operability limits to determine constrained optimization problem data.

4. The HMPC module of claim 3, wherein the optimization formulation utilizes a dynamic model prediction horizon of one or more steps.

5. The control system of claim 3, wherein the HMPC module includes an optimization solver, the optimization solver receiving input of the constrained optimization problem data from the optimization formulation to determine the multivariable control command.

6. The control system of claim 1, wherein the operability limits include a stall margin remaining limit.

7. The control system of claim 1, wherein the corrected speed signals include at least one of a corrected high pressure compressor speed and a corrected low pressure compressor speed.

8. The control system of claim 1, wherein the sensor signals include sensed engine state variables, the sensed engine state variables including at least one of a speed associated with a component of the gas turbine engine, or a temperature of a component of a gas turbine engine.

9. The control system of claim 1, wherein the synthesis signals include, at least, an engine thrust value associated with the gas turbine engine.

10. The control system of claim 1 wherein the power goals include at least one of a thrust goal, an engine spool speed goal, and a torque goal.

11. A method for controlling a gas turbine engine, the gas turbine engine including a compressor section, the method is performed by a control system, the method comprising:
    determining sensor signals using system sensors;
    estimating corrected speed signals and synthesis signals using the sensor signals, the synthesis signals including an estimated stall margin remaining;
    determining actuator goals for a HMPC module using the corrected speed signals;
    receiving power goals and operability limits by the HMPC module;
    determining a multi-variable control command for the gas turbine engine using the HMPC module in a single pass of inputs through the HMPC, wherein the multi-variable control command is determined using the inputs of power goals, the operability limits, actuator goals, sensor signals, and synthesis signals; and
    controlling the gas turbine engine based on the multivariable control command using an actuator.

12. The method of claim 11, wherein determining the multi-variable control command further includes using an optimization formulation of the HMPC module, the optimization formulation receiving input from the state variable model, the power goals, and the operability limits to determine constrained optimization problem data.

13. The method of claim 12, wherein determining the multi-variable control command further includes using an optimization solver of the HMPC module, the optimization solver receiving input of the constrained optimization problem data from the optimization formulation.

14. A gas turbine engine comprising:
    a compressor section;
    a combustor section downstream of the compressor section;
    a turbine section downstream of the combustor section; and
    a control system comprising:
        a hybrid model predictive control (HMPC) module, wherein the HMPC module receives power goals and operability limits and determines a multi-variable control command for the gas turbine engine in a single pass of inputs through the HMPC, wherein, the multi-variable control command determined using the inputs of power goals, the operability limits, actuator goals, sensor signals, and synthesis signals;
        system sensors determining the sensor signals;
        a non-linear engine model for estimating corrected speed signals and synthesis signals using the sensor signals, the synthesis signals including an estimated stall margin remaining;

a goal generation module for determining actuator goals for the HMPC module using the corrected speed signals; and actuators for controlling the gas turbine engine based on the multivariable control command.

15. The gas turbine engine of claim 14, wherein the compressor section includes a high pressure compressor and a low pressure compressor.

16. The gas turbine engine of claim 14, wherein the multi-variable control command includes a fuel flow rate to control fuel flow of the combustor section.

17. The gas turbine engine of claim 14, wherein the multi-variable control command includes instructions for the actuator to position a vane of the compressor section.

18. The gas turbine engine of claim 17, wherein the vane is at least one of a low pressure compressor stator vane or a high pressure compressor stator vane.

19. The gas turbine engine of claim 14, wherein the multi-variable control command includes instructions for positioning a bleed of the compressor section.

20. The gas turbine engine of claim 14, further comprising an exit nozzle, wherein the multi-variable control command includes instructions for positioning the exit nozzle.

\* \* \* \* \*